(12) United States Patent
Hara et al.

(10) Patent No.: US 8,723,033 B2
(45) Date of Patent: May 13, 2014

(54) ELECTRIC JUNCTION BOX

(75) Inventors: Yasuhiro Hara, Makinohara (JP);
Takuya Nakayama, Makinohara (JP);
Mitsuru Saito, Makinohara (JP)

(73) Assignee: Yazaki Corporation, Tokyo (JP)

( * ) Notice: Subject to any disclaimer, the term of this patent is extended or adjusted under 35 U.S.C. 154(b) by 16 days.

(21) Appl. No.: 13/528,982

(22) Filed: Jun. 21, 2012

(65) Prior Publication Data
US 2012/0329296 A1     Dec. 27, 2012

(30) Foreign Application Priority Data

Jun. 21, 2011 (JP) ................................. 2011-137133

(51) Int. Cl.
*H02G 3/08* (2006.01)
(52) U.S. Cl.
USPC ........... 174/50; 174/520; 174/17 R; 439/76.1; 439/76.2
(58) Field of Classification Search
USPC .......... 174/50, 520, 17 R, 51; 439/76.1, 76.2, 439/949, 535; 36/600, 601, 679.01, 730, 36/752, 760, 761; 361/600, 601, 679.01, 361/730, 752, 760, 761
See application file for complete search history.

(56) References Cited

U.S. PATENT DOCUMENTS

| 6,610,926 B2 * | 8/2003 | Chiriku et al. ........... 361/679.01 |
| 7,465,172 B2 * | 12/2008 | Ishiguro et al. ................. 174/50 |
| 7,619,896 B2 * | 11/2009 | Yamashita et al. .............. 174/50 |
| 8,378,211 B2 * | 2/2013 | Oka et al. ......................... 174/50 |
| 2013/0044447 A1 * | 2/2013 | Shiozaki et al. .............. 361/752 |

FOREIGN PATENT DOCUMENTS

| JP | 10-189179 A | 7/1998 |
| JP | 2007-151296 A | 6/2007 |

* cited by examiner

*Primary Examiner* — Angel R Estrada
(74) *Attorney, Agent, or Firm* — Edwards Wildman Palmer LLP (57) ABSTRACT

An electric junction box to prevent stress from working at a junction of conductive pattern of a connector terminal mounted on a printed wiring board and curtail its size, comprises, a printed wiring board, a connector including a terminal connected with a conductive pattern on the printed wiring board, and a connector housing accommodating the terminal, and a cover adapted to receive the printed wiring board therein and including a hole disposed on an outer wall of the cover and passing the connector therethrough. The lower cover is provided with a support adapted to overlap with a part of an edge of the connector housing surrounding the terminal, and position the part between the printed wiring board and the support.

5 Claims, 5 Drawing Sheets

ELECTRIC JUNCTION BOX

CROSS REFERENCE TO RELATED APPLICATIONS

This application is related to three co-pending applications: "ELECTRICAL JUNCTION BOX" filed even date herewith in the names of YASUHIRO HARA, TAKUYA NAKAYAMA and MITSURU SAITO which claims priority to Japanese Application No. 2011-137134 filed Jun. 21, 2011; "ELECTRIC JUNCTION BOX" filed even date herewith in the names of YASUHIRO HARA, TAKUYA NAKAYAMA and MITSURU SAITO which claims priority to Japanese Application No. 2011-137132 filed Jun. 21, 2011; and "Box Main Body" filed even date herewith in the names of YASUHIRO HARA, TAKUYA NAKAYAMA and MITSURU SAITO which claims priority to Japanese Application No. 2011-137135 filed Jun. 21, 2011; which applications are assigned to the assignee of the present application and all three incorporated by reference herein.

CROSS REFERENCE TO RELATED APPLICATION

This application is on the basis of Japanese Patent Application NO. 2011-137133, the contents of which are hereby incorporated by reference.

TECHNICAL FIELD

This invention relates to an electric junction box mounted in such an automobile as a mobile body.

BACKGROUND ART

In an automobile as a mobile body, generally, various electric devices are mounted like lamps such as a head lamp and a tale lamp and like motors such as a starter motor and an air conditioner motor.

In order to supply power to the aforementioned various electric devices, junction blocks are located optionally in the automobile in position. The junction blocks are integrally composed of various electric circuit units such as a number of fuses or relays.

Note that the junction block is also called fuse block, relay block, or collectively, electric junction box, because it may include fuses, relays and bus bars. The aforementioned fuse block, relay block, or junction block is hereinafter called electric junction box (refer to the PTL 1 or the PTL 2, for example).

An electric junction box disclosed by the PTL 1 and the PTL 2 includes a box main body, and a power distributing unit accommodated in the main body. The main body is flatly box-shaped. The main body includes a lower cover and an upper cover attached to each other and accommodating the power distributing unit. The lower cover and the upper cover are made of isolating synthetic resin and are formed by injection molding.

The power distributing unit is provided with a printed wiring board, a plurality of connectors mounted on the printed wiring board, a fuse holder holding a plurality of fuses mounted on the printed wiring board, a plurality of relays mounted on the printed wiring board. Conductive pattern of the printed wiring board electrically connects each of terminals of the connector, the fuses, and the relays according to predetermined conductive patterns.

The connector is exposed to outside the main body through a through hole passing through an outer wall of the main body. At least one of the connectors is engaged with a connector attached to a power cable terminal connected to power source such as a battery or a power generator installed in the automobile. The other connectors are engaged with connectors attached to wire harness terminals connected with various electric devices mounted in the automobile.

The fuse holder is exposed to outside the main body through the through hole passing through the outer wall of the main body. The fuse holder has a plurality of fuses. The relay is mounted on the printed wiring board, and accommodated in the main body.

The electric junction box disclosed by the PTL 1 and the PTL 2 make power supplied from the connector connected from the power source branch into conductive patterns of the printed wiring board, pass power the aforementioned fuses and the relays, and then supply power with various electric devices via the wire harness.

The electric junction box disclosed by the PTL 1 and the PTL 2, in order to prevent stress from working at junction portion of the conductive patterns for a terminal mounted on the printed wiring board upon disengaging the aforementioned wire harness connector from the connector mounted on the printed wiring board, is provided with a projection projecting from an outer surface of the connector housing of the connector mounted on the printed wiring board, and a holder holding the projection disposed on one of the upper cover and the lower cover of the main body.

CITATION LIST

Patent Literature

[PTL 1]
Japanese Patent Application Laid-Open Publication No. 10-189,179
[PTL 2]
Japanese Patent Application Laid-Open Publication No. 2007-151,296

SUMMARY OF INVENTION

Technical Problem

Since the electric junction box disclosed by the PTL 1 and the PTL 2, is provided with a projection projecting from an outer surface of the connector housing of the connector mounted on the printed wiring board, it was required a dedicate space for holding the connector housing. Thus, the printed wiring board, i.e., the main body tended to grow in size.

Therefore, an object of the present invention is to provide an electric junction box enabling to prevent stress at a junction portion of the conductive patterns for a terminal mounted on the printed wiring board from working, as well as to curtail its size.

Solution to Problem

In order to resolve the problem and attain the above-mentioned object, an electric junction box according to a first aspect of the present invention comprises: a printed wiring board; a connector including a terminal connected with a conductive pattern on the printed wiring board, and a tubular connector housing accommodating the terminal; and a cover adapted to receive the printed wiring board therein, including a hole formed on an outer wall of the cover and passing the connector therethrough, and a support adapted to overlap with a part of an edge of the connector housing surrounding the terminal so as to position the part between the printed wiring board and the support.

Preferably, according to a second aspect, in the electric junction box of the first aspect, wherein the connector housing includes a notch formed by cutting away from a peripheral wall of the connector housing so as to sink from the edge toward the printed wiring board, and wherein the support overlaps with a bottom of the notch as the part, and positions the bottom between the printed wiring board and the support.

Preferably, according to a third aspect, in the electric junction box of the second aspect, wherein the notch is formed at a middle of the peripheral wall of the connector housing.

Preferably, according to a forth aspect, in the electric junction box of the second aspect or the third aspect, wherein the cover includes a protector having the support, and wherein the protector enters into the notch, and projects from the outer wall of the cover.

According to the electric junction box of the first aspect, since the support of the cover overlaps with the part of the edge of the connector housing surrounding the terminal, and positions the part between the printed wiring board and the holder. Thus, without providing the part projecting from an outer surface of the connector housing, it is made possible to prevent a stress from working at a junction portion of the conductive patterns for the terminal mounted on the printed wiring board.

According to the electric junction box of the second aspect, since the support overlaps with the bottom surface of the notch as the part, it is made possible for the support to hold a portion near the printed wiring board of the connector housing.

According to the electric junction box of the third aspect, since the notch is disposed at a middle of the peripheral wall of the connector housing, it is made possible to prevent a middle of the printed wiring board from floating from the printed wiring board.

According to the electric junction box of the forth aspect, since the cover has the protector having the support, entering into the notch, and projecting from the outer wall. This makes possible to prevent the mating connector from entering into the notch if providing the notch in the connector housing. This also makes it possible to prevent the terminal from being pried (broken) by the mating terminal.

Furthermore, since the aforementioned protector is disposed in the cover that is not mounted on the printed wiring board, it is made possible to further reduce cost than when the protector is disposed in the connector housing that is required of heat resistance.

Advantageous Effects of Invention

As discussed above, the electric junction box of the first aspect, without providing the part projecting from the outer surface of the connector housing, it is made possible to prevent the stress at the junction portion of the conductive patterns for the terminal mounted on the printed wiring board from working, as well as to curtail its size.

Since in the electric junction box of the second aspect, the support holds a portion near the printed wiring board of the connector housing, it is made less likely that the terminal of the connector may move relative to the printed wiring board. This makes it possible to prevent the terminal, when disengaged from the mating connector, from moving relative to the printed wiring board, and thus securely prevent the stress at the junction of the conductive patterns of the terminal of connector mounted on the printed wiring board from working.

Since in the electric junction box of the third aspect, the middle of the printed wiring board, when engaged from the mating connector, is prevented from floating from the printed wiring board, it is made possible to securely prevent the terminal from moving relative to the printed wiring board, and also securely prevent the stress at the junction of the conductive patterns of the terminal of connector mounted on the printed wiring board from working.

Since the electric junction box of the forth aspect, the mating connector, when providing the notch in the connector housing, is prevented from entering into the notch, it is made possible for the connector housing to be accidentally broken. Further, it is made possible to prevent the terminal from being pried (broken) by the mating terminal.

Furthermore, the aforementioned protector is provided in the cover not mounted on the printed wiring board, and it is thus made possible to further reduce cost than when the protector is disposed in the connector housing that is required of heat resistance.

BRIEF DESCRIPTION OF DRAWINGS

[FIG. 1]
[FIG. 2]
[FIG. 3]
[FIG. 4]
[FIG. 5]
[FIG. 6]
[FIG. 7]
[FIG. 8]

DESCRIPTION OF EMBODIMENTS

Hereinafter, an electric junction box according to one embodiment of the present invention will be discussed with reference to FIGS. 1 to 8. The electric junction box 1 according to the present embodiment, illustrated in FIG. 1, is installed in an automobile as a mobile body.

Figure 1:
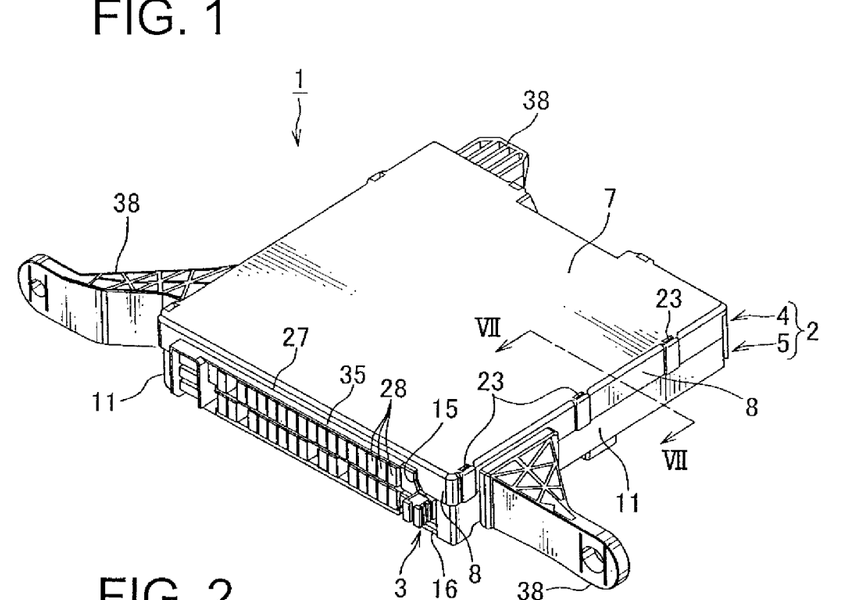
FIG. 1 is a perspective view of an electric junction box according to one embodiment of the present invention.
Figure 2:
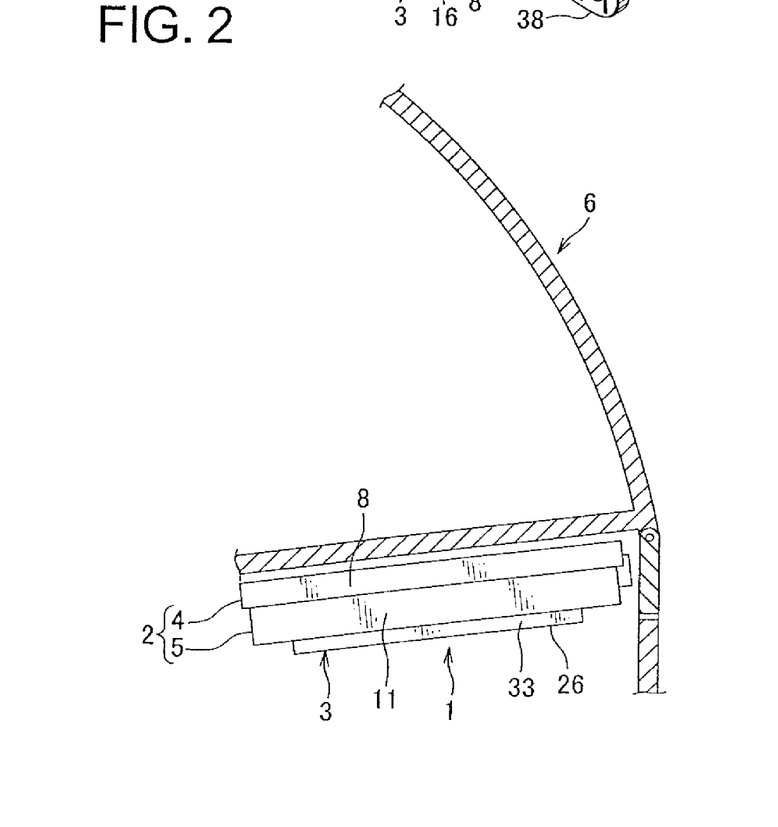
FIG. 2 is an explanation view illustrating a state that the electric junction box illustrated in FIG. 1 is mounted in an automobile.
Figure 3:
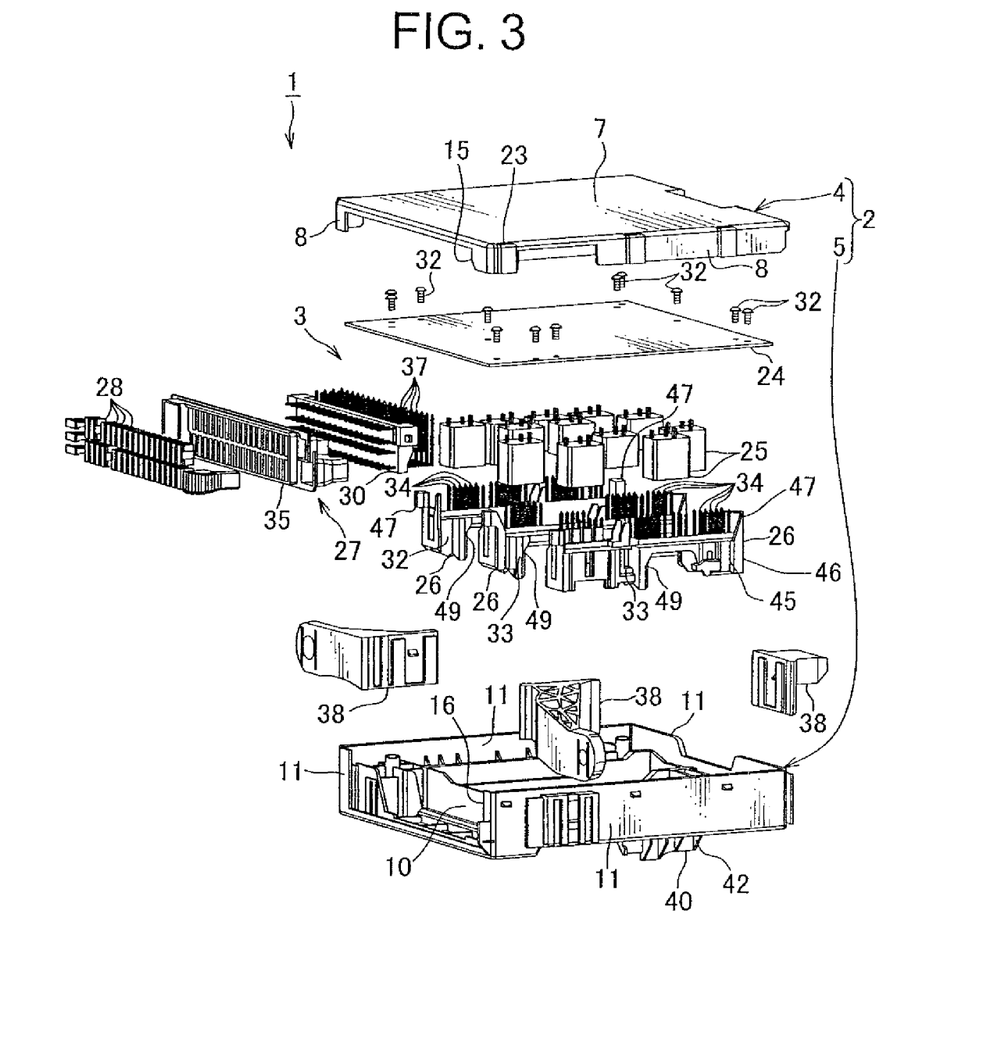
FIG. 3 is an exploded perspective view of the electric junction box illustrated in FIG. 1.

The electric junction box 1, as shown in FIGS. 1 to 3, is provided with a main body 2, and a power distributing unit 3 (shown in FIG. 3). Note that in the present embodiment, a direction in which an upper cover 4 and a lower cover 5 of the main body 2 are stacked to each other is called a depth direction Z, a direction which crosses (orthogonal direction in the illustrated example) the depth direction Z and in which a plurality of fuses 28 to be mentioned below are each arranged is called a width direction, a direction which crosses (orthogonal direction in the illustrated example) both the depth direction Z and the width direction X is called a length direction Y.

The electric junction box 1 of the present invention, while the depth direction Z being generally parallel to an orthogonal direction, as shown in FIG. 2, is attached to a lower portion of a center console 6 of the automobile. Note that the electric junction box 1, in the illustrated example, its depth direction Z is slightly inclined to the orthogonal direction in such a way as to gradually approach to down the automobile as approaching to front of the automobile, and an upper cover 4 is stacked above a lower cover 5 in a direction orthogonal to a surface of a metal board 24 to be mentioned below.

The main body 2 is formed into flat-box shape and includes the upper cover 4 and the lower cover 5 as covers to be joined to each other. The upper cover 4 and the lower cover 5 are made of isolating synthetic resin and formed by known injection molding.

Figure 8:
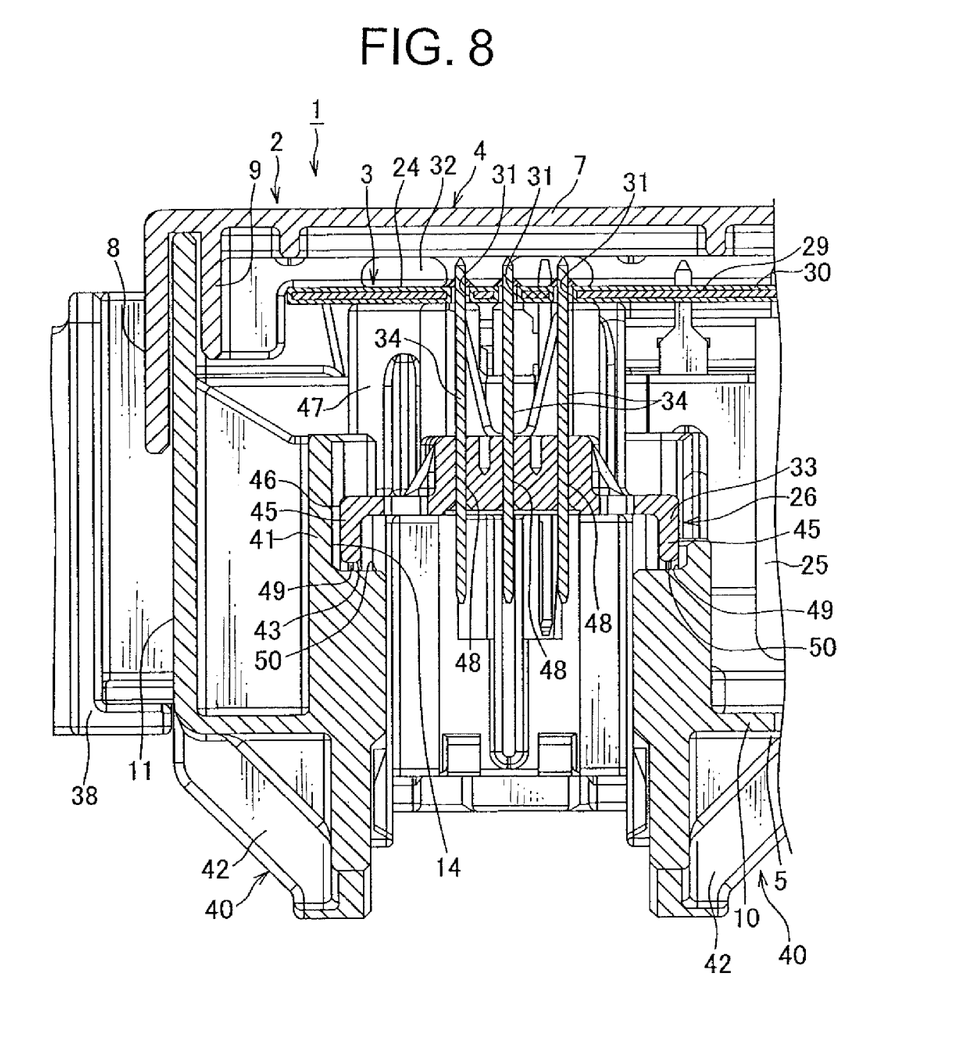
FIG. 8 is a cross-sectional view taken along VIII-VIII line in FIG. 1.

The upper cover 4 is provided with a generally plane ceiling wall 7, four peripheral walls 8 upstanding from each of outer edges of the ceiling wall 7, an inner wall 9 (shown in FIG. 8). The inner wall 9 is disposed inside the peripheral wall 8 and upstands from the ceiling wall 7. The inner wall 9 is disposed spaced from, and in parallel with, the peripheral wall 8 and across generally entire circumference of the outer edges of the ceiling wall 7 of the upper cover 4.

Figure 6:
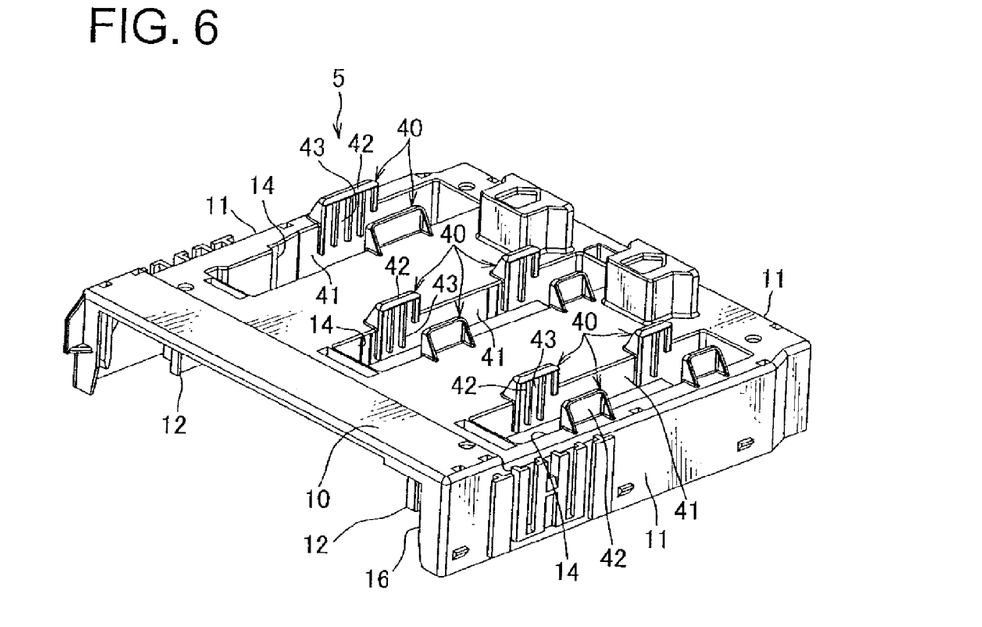
FIG. 6 is a perspective view of a lower cover of the electric junction box illustrated in FIG. 3.
Figure 7:
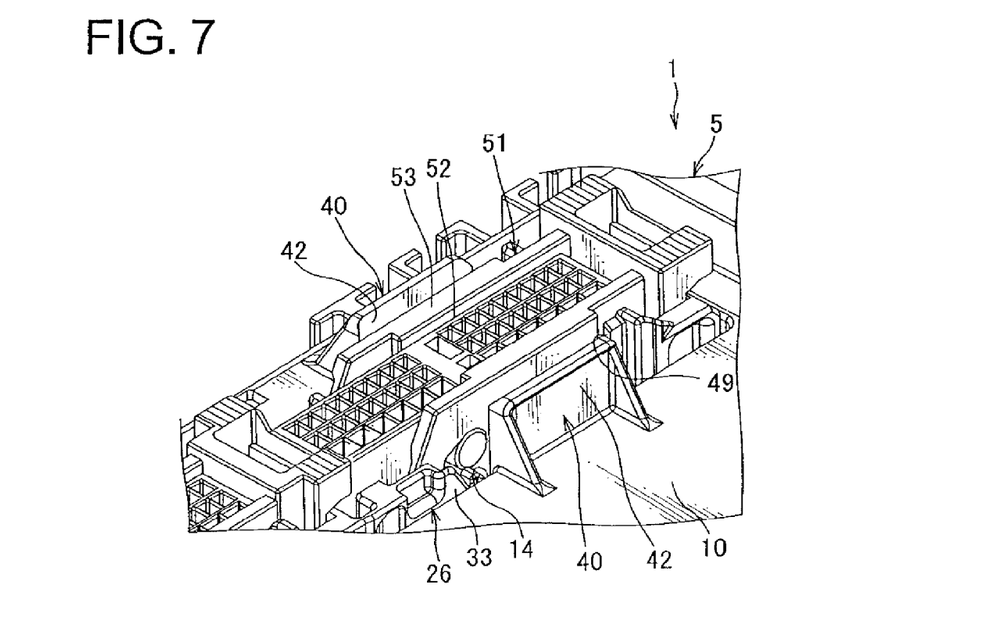
FIG. 7 is a perspective view illustrating a state that a mating connector is engaged with the connector illustrated in FIG. 4.

The lower cover 5 is provided with a generally plane bottom wall 10, four peripheral walls 11 upstanding from each of outer edges of the bottom wall 10, a protector 40. The bottom wall 10 is provided with a hole 14 (shown in FIG. 8) for passing a connector 26 to be mentioned below. Planer shape of the hole 14 as shown in FIG. 6, is formed oblong. From inner edges of the hole 14 a surrounding wall 41 upstands which projects toward inside the lower cover, i.e., the main body 2.

The protector 40 as shown in FIG. 6 is disposed integral with a long side of the edges of the hole 14. The protector 40 as shown in FIG. 8, is integrally provided with a projection 42 projecting from a surface of the bottom wall 10, a support 4 disposed across the projection 42 and the surrounding wall 41 and projecting toward inside the hole 14. The support 43, when the protector 40 accommodates the power distributing unit 3 in the main body 2, enters into a notch 49 of the connector of the power distributing unit 3 to be mentioned below. The protector 40, by the support 43 thus entering into the notch 43, enters into the notch 49. The support 43, when the protector 40 accommodates the power distributing unit 4 in the main body 2 as shown in FIG. 8, is overlapped with a bottom 50 of the notch 49 as a part of edge of the connector housing 33 of the connector 26 in the power distributing unit 3, positioning the bottom 50 between a metal board 24 as the printed wiring board and the support 43. Note that the edge of the connector housing 33 herein is meant as a portion of the connector housing 33 surrounding the terminal 34 and visually recognized from the mating connector 26.

Of the four peripheral walls 8 and 11 of the upper cover 4 and the lower cover 5, the peripheral walls 8 and 11 in the front of FIGS. 1 and 3 are provided with notches 15 and 16 for exposing a fuse plate 35 to be mentioned below and a fuse 28 attached to the fuse plate 35.

The upper cover 4 and the lower cover 5 are joined to each other, through the ceiling wall 7 and the bottom wall 10 being spaced to each other in parallel, and an outer edge of the peripheral wall 8 being stacked outside the outer edge of the peripheral wall 11. The inner wall 9 at this time is stacked on an inner surface of the peripheral wall 11 of the lower cover 5.

In the present embodiment, the lower cover 5 is provided with a lock projection, the upper cover a locking step for locking with the lock projection.

The power distribution unit 3, as shown in FIG. 3, is provided with the metal board 24 as printed wiring board, a plurality of relays 25, a plurality of connectors 26, a fuse holder 27, and a plurality of fuses 28.

The metal board 24 as shown in FIG. 8 is provided with a metal plate 29 made of aluminum alloy or copper alloy and the like, an isolating plate 30 made of isolating resin in which the aforementioned metal plate 29 is embedded, and not-shown conductive patterns formed on an outer face of the isolating plate 30. The metal board 24 as shown in FIG. 8 is provided with a plurality of through holes 31 passing across both surfaces thereof. An inner face of the through hole 31 is covered with the same synthetic resin as the isolating plate 30. The conductive patterns of the metal board 24 connect each of the terminals of the connector 26, the relays 25, and the fuses 28 via predetermined patterns. The metal board 24, while spaced from, and in parallel with, the ceiling wall 7 and the bottom wall 10, is accommodated in the covers 4 and 5. The metal board 24 is fixed to the lower cover, i.e., the main body 2 with a screw 32 that is threaded into a boss disposed in the lower cover 5. The metal board 24 is thus accommodated in the lower cover 5, i.e., the main body 2, and its surface is arranged in horizontal direction. Note that in the present invention, a horizontal angle with the surface of the metal board 24 being within 0 degrees to tens of degrees is called a state in which the surface of the metal board 24 runs along in the horizontal direction.

The relays 25 are mounted on the metal board 24, and their terminals are connected with the conductive patterns on the metal board 24.

The connector 26 is provided with an isolating connector housing 33 and a plurality of conductive terminals 34. In order to mount the connector 26 on the metal board, the connector housing 33 is made of isolating synthetic resin more heat-resistant and costly than the covers 4 and 5.

Figure 4:
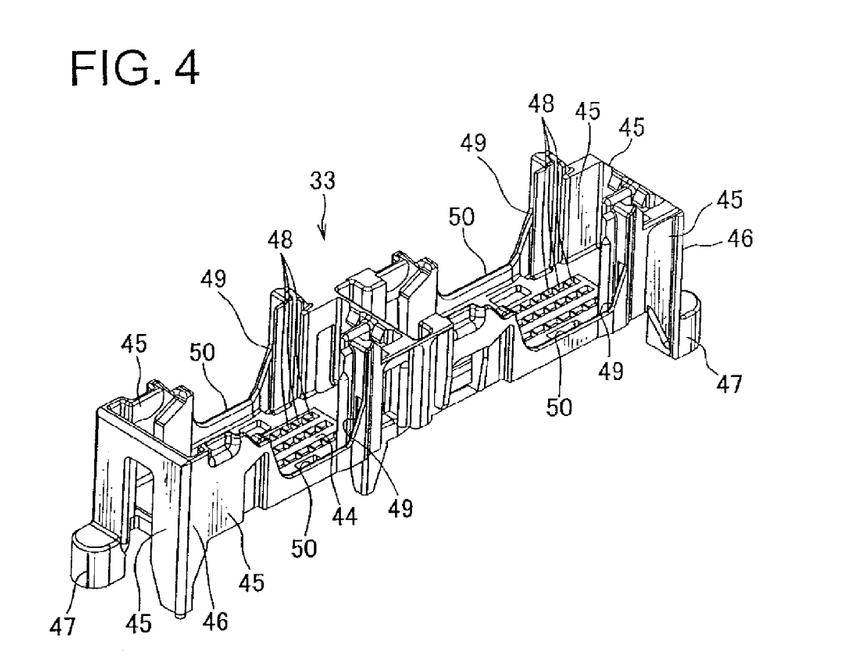
FIG. 4 is a perspective view of the connector of the electric junction box illustrated in FIG. 3.

As shown in FIG. 4, the connector housing 33 is integrally provided with a bottom plate 44 spaced from the metal board 24, a tubular part 46 composed of a plurality of peripheral walls 45 upstanding from the edge of the bottom plate 44, and a boss 47 upstanding from an outer edge of the tubular part 46 toward the metal board 24, and is formed tubular overall.

The bottom wall 44 is provided with a plurality of through holes 48 passing the terminal 34. The tube 46 is provided with a notch 49 by cutting away from the peripheral wall 45 of the connector housing 33 so as to sink from the tube 46, i.e., the aforementioned edge of the connector housing 33 toward the metal board 24. The notch 49 is disposed a middle of the peripheral wall 45 that is a long side of the tube 46 of the peripheral walls 45 of the tube 46. The boss 47 is threaded by a not-shown screw passing through the metal board 24 to be attached to the metal board 24. The connector housing 33 is attached to the metal board 24 and is exposed out of the lower cover 5, i.e., the main body 2 via the through hole 14 passing through the bottom wall 10.

The terminal 34 is made of conductive metal and is bar-shaped. The terminal 34 is held by the connector housing 33, passing though the through hole 48, and is connected with the conductive pattern on the metal board 24. Of the connectors 26 one connector 26 is engaged with a connector attached to the power cable terminal connected with the power source of the vehicle. The other connectors 26 are engaged with the mating connector 51 (shown in FIG. 7) attached to the terminal of the wire harness connected with various electric devices of the vehicle.

Figure 5:
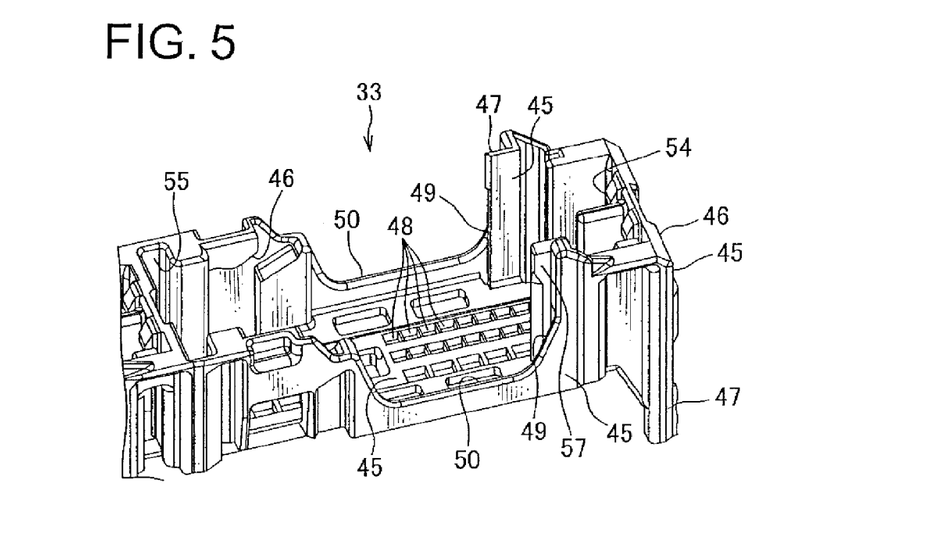
FIG. 5 is a perspective view of main section of the connector illustrated in FIG. 4.

The mating connector 51 is provided with a connector housing 52 engaging with the connector housing 33 to accommodate a terminal connected with the terminal 34, and a lever 53 pivotally supported by the connector housing 52 and bringing the connector housings 33, 52 close to each other. Thus, the connector housing 33, as shown in FIG. 5, is provided with a engaging part 54 for fixing the connector housing 51, a guide groove 55 guiding the connector housing 33, a lever-guiding groove 56 guiding not-shown projection of the lever 53, a rotation prevention part 57 preventing unexpectedly rotation of the lever 53 induced by widening the lever 53 after engagement of the connectors 26 and 51. Note that in FIG. 7, the electric wire brought into connection with the terminal is omitted.

The fuse holder 27, as shown in FIG. 3, is provided with a fuse plate 35, a fuse-terminal holder 36, and a plurality of conductive terminals 37. The fuse plate 35 is made of isolating synthetic resin, to which a plurality of fuses 28 is attached. The fuse plate 35 covers the notches 15 and 16 of the upper cover 4 and the lower cover 5, and is attached to these covers 4 and 5 in such a way as to expose the fuse 28. The fuse-terminal holder 36 is made of isolating synthetic resin and is attached to the fuse plate 35.

Furthermore, the terminal 37 is held by the fuse-terminal holder 36 and connected with fuse 28 to be attached to the fuse plate 35. The terminal 37 is connected with the conductive pattern on the metal board 24. The fuse holder 27 is mounted to the metal board 24 while the terminal 37 is connected with conductive pattern on the metal board 24. The plurality of fuses 28 is attached to the fuse plate 35 of the fuse holder 27.

The aforementioned power distributing unit 3 braches power from the power source into conductive pattern on the metal board 24, passing power the fuse 13 or relay 14, and supply power with various electric devices.

The aforementioned electric junction box 1 is provided with a plurality of brackets 38 for fixing the upper cover 4 and the lower cover 5, i.e., the main body 2 to the car body of the automobile According to the present invention, the support 43 of the lower cover 5 overlaps with the bottom of the notch 49 as the part of the edge of the housing 33 surrounding the terminal 34, and positions the bottom 50 between the metal board 24 and the support 43. Thus, it is made possible, without providing a part projecting from an outer surface of the connector housing 33, to prevent stress from working at the junction part of the conductive pattern of the terminal 34 of the connector 26 mounted on the metal board 24. Therefore, it is made possible to prevent stress from working at the junction part of the conductive pattern of the terminal 34 of the connector 26 mounted on the metal board 24, as well as to curtail its size.

Since the support 43 overlaps with the bottom 50 of the notch 49 as a part of the edge of the connector housing 33, the support 43 is designed to hold the connector housing 33 near the metal board 24. Thus, it is made less likely that the terminal 34 of the connector 26 moves relative to the metal board 24. Therefore, it is made possible to prevent the terminal 34, when the mating connector 26 is disengaged, to move relative to the metal board 24, and to securely prevent stress from working at the junction part of the conductive pattern of the terminal 34 of the connector 26 mounted on the metal board 24.

Since the notch 49 is provided with the middle of the peripheral wall 45 of the connector housing 33, it is made possible to prevent the middle of the connector 26, when the mating connector 26 is disengaged, from floating from the metal board 24. Thus, it is made possible to securely prevent the terminal 24 from moving relative to the metal board 24, and to securely prevent stress from working at the junction part of the conductive pattern of the terminal 34 of the connector 26 mounted on the metal board 24.

The lower cover 5 is provided with the protector 40 having the support 43, entering into the notch 43, and projecting from the bottom wall 10. Thus, it is made possible to prevent the mating connector 26 from entering into such the notch 49 even if disposing the notch 49 in the connector housing 33. Therefore, it is made possible to prevent the connector housing 33 from being unexpectedly broken.

Furthermore, since the aforementioned protector 40 is disposed in the lower cover 5 not mounted on the metal board 24, it is made possible to further cost down than when to dispose the protector 40 in the connector housing 33 required of heat-resistance for mounting on the metal board 24.

In the aforementioned embodiment, while the metal board 24 is disclosed as a printed wiring board, a printed board may be employed as a printed wiring board in which conductive pattern is formed on outer surface of the isolating board made of isolating synthetic resin. Furthermore, it is absolutely clear that position of the notch may be optionally changed.

It is to be understood that the aforementioned embodiment only shows a typical one of the present invention but that the present invention is not limited to the examples discussed above. Therefore, unless otherwise such changes and modifications depart from the scope of the present invention hereinafter defined, they should be construed as being included therein.

REFERENCE SIGNS LIST 1 electric junction box
5 lower cover (cover)
10 bottom wall (outer wall)
14 hole
24 metal board (printed wiring board)
26 connector
33 connector housing
34 terminal
40 protector
43 support
49 notch
50 bottom (part of edge)

The invention claimed is:

1. An electric junction box, comprising:
(a) a printed wiring board;
(b) a connector including a terminal connected with a conductive pattern on the printed wiring board, and a tubular connector housing accommodating the terminal; and
(c) a cover adapted to receive the printed wiring board therein, including
   (i) a hole formed on an outer wall of the cover and passing the connector therethrough, and
   (ii) a support adapted to overlap with a part of an edge of the connector housing surrounding the terminal so as to position the part between the printed wiring board and the support,
wherein the support overlaps with a bottom of a notch of the part.

2. The electric junction box as claimed in claim 1,
wherein the connector housing includes a notch formed by cutting away from a peripheral wall of the connector housing so as to sink from the edge toward the printed wiring board, and wherein the support overlaps with a bottom of the notch as the part, and positions the bottom between the printed wiring board and the support.

3. The electric junction box as claimed in claim 2, wherein the notch is formed at a middle of the peripheral wall of the connector housing.

4. The electric junction box as claimed in claim 2, wherein the cover includes a protector having the support, and wherein the protector enters into the notch, and projects from the outer wall of the cover.

5. The electric junction box as claimed in claim 3, wherein the cover includes a protector having the support, and wherein the protector enters into the notch, and projects from the outer wall of the cover.

\* \* \* \* \*